(12) United States Patent
Van Heeswyk et al.

(10) Patent No.: US 6,333,926 B1
(45) Date of Patent: Dec. 25, 2001

(54) MULTIPLE USER CDMA BASESTATION MODEM

(75) Inventors: Frank Martin Van Heeswyk, Ottawa; Paul Newson, Kanata, both of (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/132,466

(22) Filed: Aug. 11, 1998

(51) Int. Cl.[7] .................................................. H04B 7/216
(52) U.S. Cl. ........................ 370/335; 370/320; 375/144; 375/148
(58) Field of Search .................................. 375/130, 141, 375/144, 146, 148; 370/320, 334, 335, 342, 441, 329

(56) References Cited

U.S. PATENT DOCUMENTS

| 4,641,238 | 2/1987 | Kneib | 364/200 |
|---|---|---|---|
| 5,367,563 | 11/1994 | Sainton | 379/98 |
| 5,577,105 | 11/1996 | Baum et al. | 379/93 |
| 5,956,642 | * 9/1999 | Larsson et al. | 455/449 |

OTHER PUBLICATIONS

Qualcomm CMA Cell Site Modem (CSM) Data Sheet.

* cited by examiner

Primary Examiner—Wellington Chin
Assistant Examiner—Brenda H. Pham

(57) ABSTRACT

A CDMA modem with dynamically allocatable demodulation and modulation, encoding/interleaving and decoding/de-interleaving for multiple resources users is provided. Each component is individually configurable to function as any one of various physical layer channel types for one or more different CDMA standards.

15 Claims, 12 Drawing Sheets

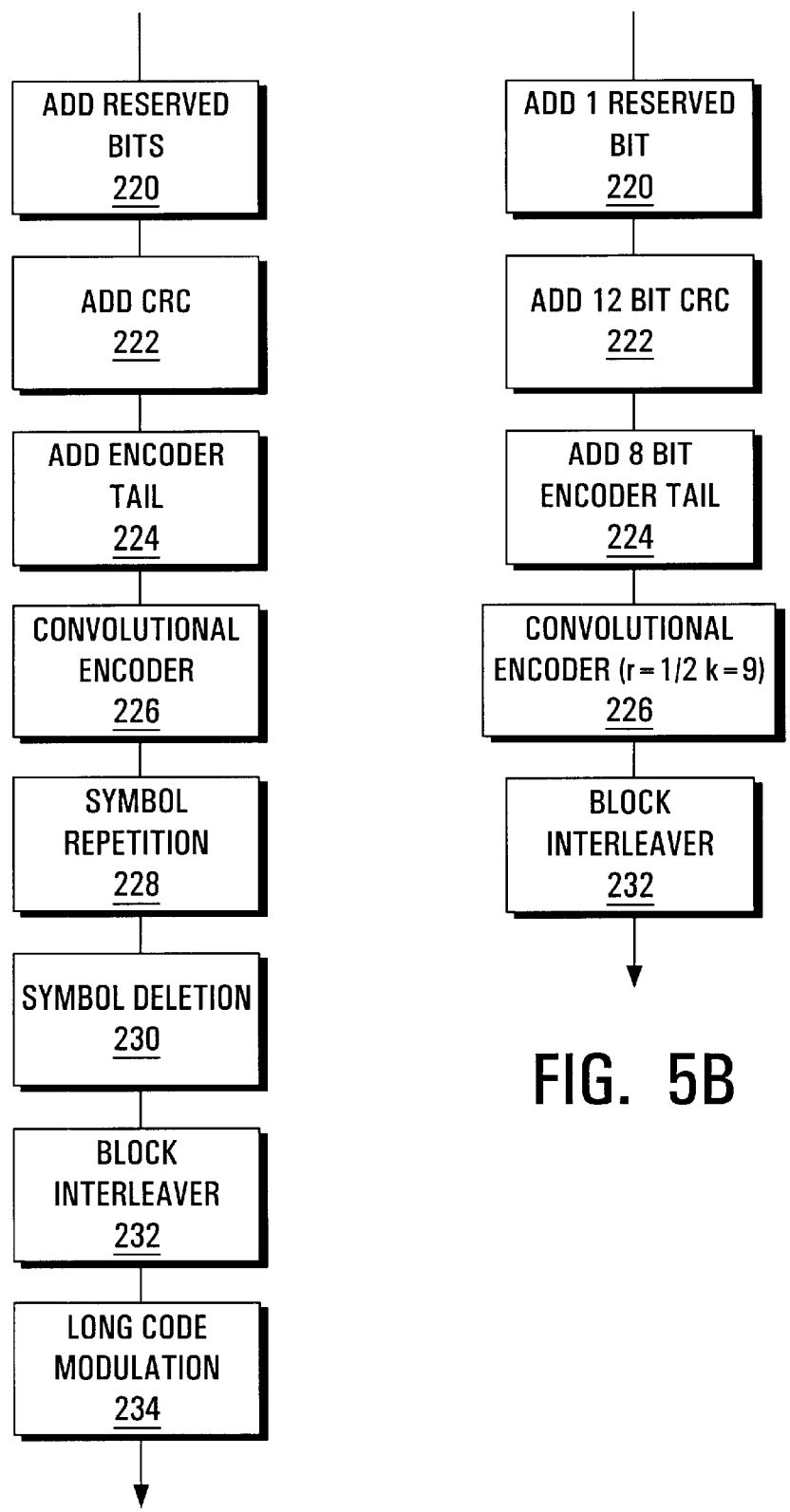

MULTIPLE USER CDMA BASESTATION MODEM

FIELD OF THE INVENTION

The invention relates to CDMA (code division multiple access) basestation modems.

BACKGROUND OF THE INVENTION

In CDMA (code division multiple access) systems, the modem is the heart of the BTS (basestation transceiver subsystem). The modem performs the base band CDMA signal processing that converts data received from the BSC (basestation controller) to the CDMA air interface format on the forward link (the transmitter), and it receives the reverse link CDMA air interface signals from the mobile and converts the information into a format that the BSC understands. There is modem in every CDMA BTS regardless of manufacture.

Typically, a single BTS is designed to support multiple users. Furthermore, the BTS may need to be designed to support more than one of the various different air interface standards currently available. Current modems each process a single user for a single standard. If multiple users or multiple standards are to be supported by a BTS, multiple modems are required, one for each user of a particular standard. Thus, BTS complexity scales directly in proportion to the number of users and standards supported. Typically, BTS modems are designed on a single chip. Recently, chips have been designed which simply replicate the functionality of a single modem to create multiple-modem chips. Replicating a single modem on a chip does not alter this direct proportionality factor, it only shrinks the size of the system packaging.

SUMMARY OF THE INVENTION

It is an object of the invention to obviate or mitigate one or more of the above identified disadvantages.

According to a first broad aspect, the invention provides a CDMA transmitter signal processing apparatus comprising: an encoder/interleaver bank having a plurality of encoder/interleavers each having an input and an output; a modulator bank comprising a plurality of modulators each having an input and an output; a modulator switch for connecting any encoder/interleaver output to any one or more modulator inputs; a plurality of summers each having a respective plurality of inputs and an output; and an output switch for connecting any modulator outputs to any summer input.

According to a second broad aspect, the invention provides a CDMA receiver apparatus comprising: a plurality of fingers each having an input and an output; a switch for switching each of a plurality of receive inputs to any one or more finger inputs; a plurality of summers each having a respective plurality of inputs and an output; a weighting and thresholding circuitry connected to the outputs of the fingers and having thresholded outputs connected to an output switch which connects any thresholded output to any summer input.

According to a third broad aspect, the invention provides a configurable modulator comprising: a first modulator path containing BPSK modulation functions and functions for a first half of a QPSK modulator; a second modulator path containing functions for a second half of a QPSK modulator; input routing circuitry switchable between a first state and a second state, which when in said first state routes entire received bit streams to the first modulator path thereby causing the configurable modulator to function in a BPSK mode, and when in said second state routes the received bit streams to said first path and to said second path thereby causing the configurable modulator to function in a QPSK mode.

According to a fourth broad aspect, the invention provides a configurable encoder/interleaver comprising: an add reserved bits block; an add CRC block; an add encoder tail block; a convolutional encoder block; a symbol repetition block; a symbol deletion block; a block interleaver block; a long code modulation block; wherein each block of the encoder/interleaver is individually configurable or bypassable.

According to a fifth broad aspect, the invention provides a configurable decoder/de-interleaver comprising: a long code demodulation block; a block de-interleaver block; a symbol integration block; a convolutional decoder block; a remove encoder tail block; a remove and check CRC block; and a remove reserved bits block, wherein each block of the decoder/de-interleaver is individually configurable or bypassable.

According to a sixth broad aspect, the invention provides a CDMA demodulator comprising: a plurality of functional blocks each configurable to function for at least two different standards; for each said standard, a respective plurality of functional blocks permanently configured to function for the standard; switching means for switching the demodulator between different standards by configuring each configurable block to that standard, by switching in each permanently configured block for that standard, and by switching out each permanently configured block for any other standard.

The multiple user CDMA BTS modem architecture provided by the invention does not increase in size in direct proportionality to the number of users and standards to be supported. It achieves this firstly by supporting multiple users across multiple standards on a single modem on a single chip and secondly by efficiently sharing the key modem resources across the users and across the standards. This enables an economy of scaling in which an 'N' user modem is less than 'N' times more complex that the single user modem. This economy of scaling translates into a reduced cost for the multiple user modem on a per user basis than the single user modem.

BRIEF DESCRIPTION OF THE DRAWINGS

Preferred embodiments of the invention will now be described with reference to the attached drawings in which:

FIG. 5A is a functional block diagram for an encoder/interleaver for use in the transmit modem architecture of FIG. 4A;

FIG. 5B is a functional block diagram of an example of the encoder/interleaver of FIG. 5B configured in a particular manner;

DETAILED DESCRIPTION OF THE PREFERRED EMBODIMENTS

In order to understand the design of the modem it is important to have an appreciation of CDMA cellular systems. A brief overview of a CDMA cellular system will be given with reference to FIG. 1. Following this the signal processing performed within a conventional transmitter and receiver of a CDMA BTS is described with reference to FIGS. 2 and 3. These functions are common to all CDMA BTSs, independent of the manufacturer.

CDMA Cellular System Overview

Figure 1:
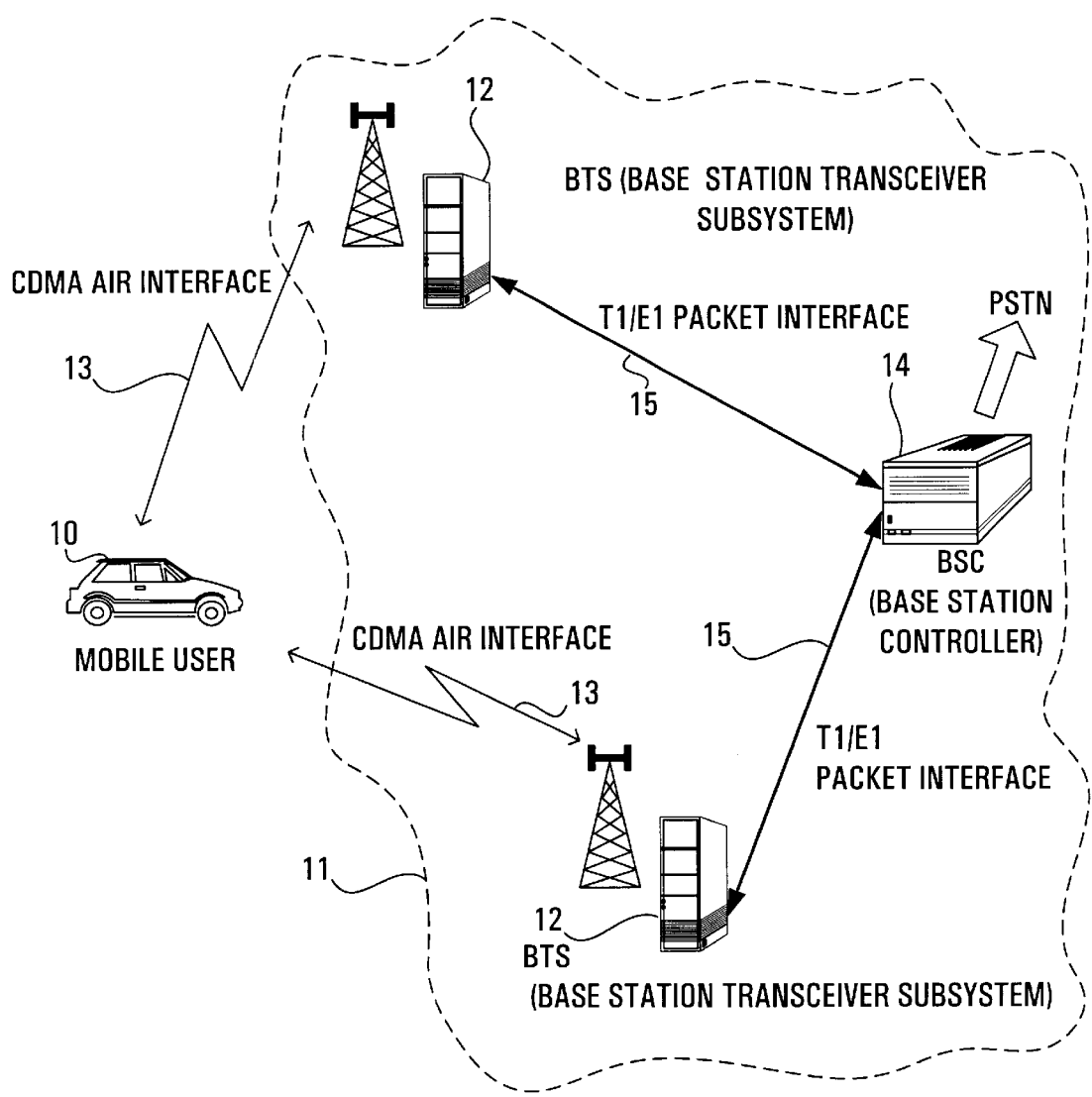
FIG. 1 is an overview of a conventional CDMA cellular system.

Referring firstly to FIG. 1, a generic CDMA cellular system comprises a plurality of terminals 10 (only one shown, shown inside a car), connectable through a CDMA air interface 13 to a network 11 comprising a plurality of BTSs 12 (only two shown), a plurality of BSCs 14 (only one shown) each connected to one or more BTSs, with each BSC connected to a MSC (mobile switching centre, not shown) forming part of or connected to a PSTN (public switched telephone network, not shown).

The terminal 10 consists of equipment used by an end user to make access to the network 11. It may provide voice only, data only, simultaneous voice and data, and location services for many different environments including indoor, low mobility, full mobility and fixed wireless. Within these different applications the terminal 10 may be referred to as a mobile station (MS), handset or simply mobile.

The BTSs 12 convert the network baseband data to signals compatible with the CDMA air interface 13. The link between the terminal 10 and the BTS 12 is over the air on the desired frequency band (e.g., cellular, PCS). The links between the BTSs 12 and the rest of the network 11 (through the BSC 14) are T1/E1 packet interfaces 15 that are typically carried over wire lines. The BTS 12 performs basic functions such as baseband signal processing (modulation, demodulation, encoding, decoding), channelization, conversion to and from RF (radio frequency), signal power amplification and transmission over the air interface.

The BSC 14 performs two principle functions. Firstly it performs the signal processing functions not encompassed within the BTS such as vocoder and soft handoff signal combining. Secondly it acts as the controller for numerous BTSs 12. It performs such functions as call set-up/tear down, BTS 12 static and dynamic configuration and operations, administration and maintenance.

The MSC provides an interface to the PSTN and, therefore, allows mobile users to make access to the wider telephone network.

The link from the MSC to the terminal 10 is the "forward link" and the link from the terminal 10 to the MSC is the "reverse link".

In the forward link direction, data packets are sent by the BSC 14 addressed to a particular BTS 12 (or BTSs for soft handoff). The BTS 12 converts the packets into a form that adheres to a particular CDMA air interface standard. The BTS 12 then transmits the data to the terminal 10 over the CDMA air interface 13. In addition to performing this signal processing and routing function, the BTS 12 efficiently manages its resources and monitors performance. It also performs many of the management and control functions required to support the CDMA air interface standard. For example, it creates pilot, sync, and overhead channels.

In the reverse link direction the terminal 10 transmits its data to the BTS 12 over the CDMA air interface 13. The BTS 12 receives this data and converts it to a packet format that can be sent to the BSC 14 over the T1/E1 packet interface 15.

Forward Link CDMA Signal Processing

In the transmit direction the signal processing functions performed by the BTS in a CDMA wireless network are as follows: data conversion from packet to serial format and signal routing, encoding/interleaving, baseband modulation, forward link signal power correction, transmit pulse shaping, signal combining, baseband channelization, conversion from digital to analogue signals, upconversion and filtering, power amplification, duplexing and transmission over the air interface.

Figure 2A:
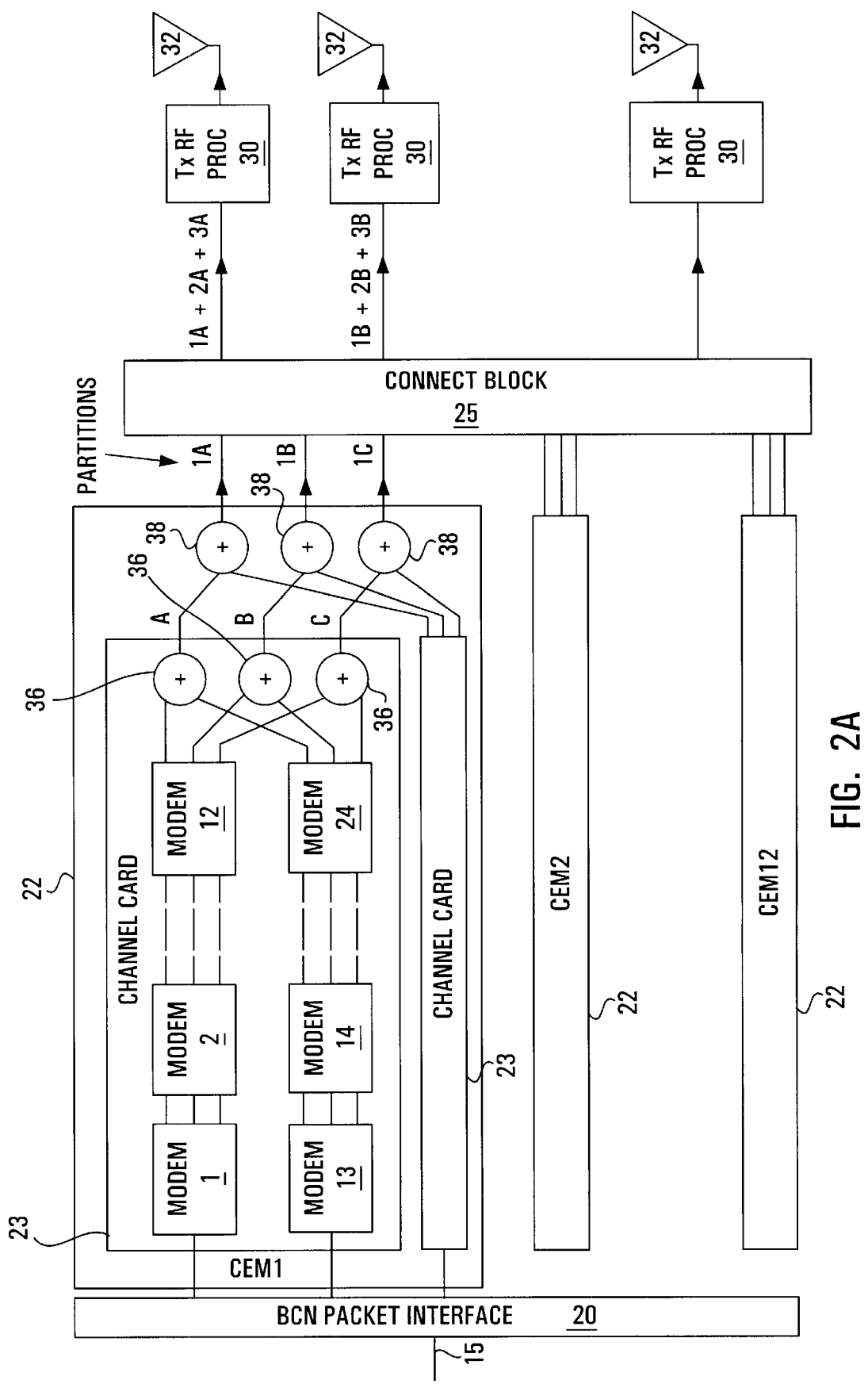
FIG. 2A is a block diagram of a conventional basestation transmitter.

A complete conventional BTS transmitter is depicted in FIG. 2A, and comprises, connected together in sequence, a BCN (basestation communications network) packet interface 20 connected to the T1/E1 packet interface 15, a number of CEMs (channel element module) 22 each containing a pair of channel cards 23, a connect block 25, transmit RF processing blocks 30, and antenna sectors 32.

Each channel card 23 consists of twenty-four modems labelled modem 1 through modem 24 daisy chained together in two chains of twelve each. As discussed in further detail below, each modem has three dedicated modulation paths. The paths from the two daisy chains are added together with adders 36, while the paths from the two channel cards 23 in the same CEM 22 are added with adders 38. The three outputs 1A, 1B, 1C thus produced are connected to one of the RF signal processing blocks 30 with the connect block 25. The connect block 25 in conventional designs may consist of hard wired connections, or statically configurable connections.

The BCN packet interface 20 receives packet data signals over the network via the T1/E1 packet interface 15, converts them to serial form, and routes them to a channel card 23.

Each modem is configurable to support different physical layer channel types such as a pilot channel, a sync channel, paging channel and IS-95 fundamental channel.

Figure 2B:
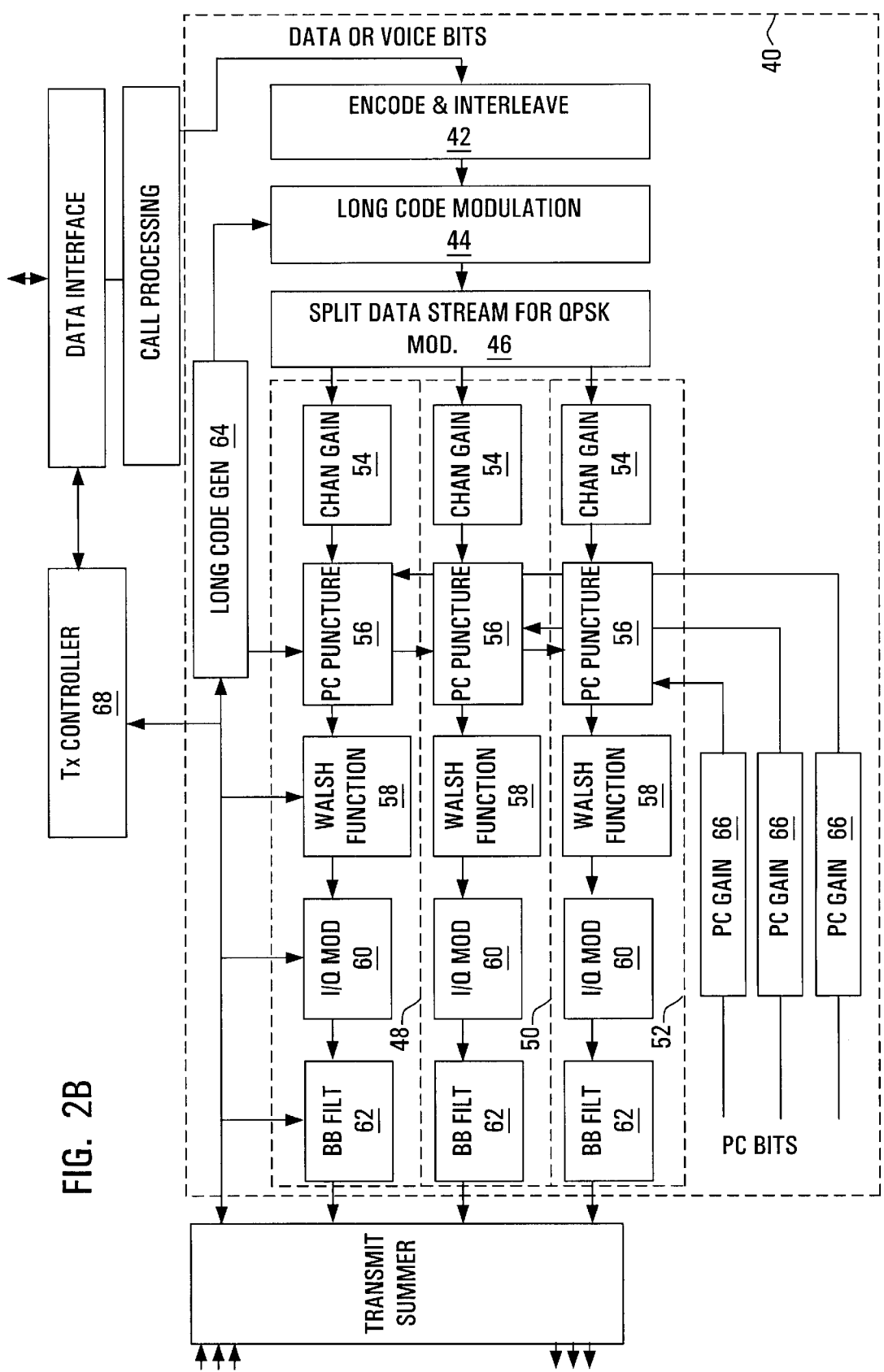
FIG. 2B is a block diagram of transmit functionality of a conventional modem.

The signal processing functions performed by the modem for each physical layer channel vary depending upon which channel is under consideration. In general, a similar type of processing is performed for any physical layer channel. The following are the principal functions:

Encoding and interleaving: This comprises conventional encoding, symbol repetition and symbol interleaving. The exact process performed in each of these blocks is quite different for different physical layer channels;

Digital channel gain control: this is part of the forward link power control mechanism of the CDMA system. Three factors are important, data rate, soft-handoff status, and the power required by the mobile to achieve a given performance at its current location;

Walsh spreading: Walsh spreading provides CDMA signal spreading and user definition on the forward link;

PN (pseudo-noise) spreading: PN spreading represents the fundamental signal spreading operation required within all direct sequence CDMA systems. The PN spreading blocks each have I and Q baseband data outputs ultimately connected to the connect block 25; and The details of one of the modems in the channel card 23 of FIG. 2A from a transmit perspective are shown in FIG. 2B. Each modem includes the functionality within dotted box 40. This includes an encode and interleave block 42, a long code modulation block 44, and a block 46 for distributing the data stream across three modulation paths. Following this there are three modulation paths 48, 50, 52 each containing a channel gain block 54, a PC (power control) puncture block 56, a Walsh function 58, I/Q modulator 60 and baseband filter 62. A single long code generation block 64 is connected to the PC puncture blocks 56 and the long code modulation block 44. Three PC gain blocks 66 are each connected to a respective one of the PC puncture blocks 56. Each of the three paths 48, 50, 52 are configurable under control of a TX controller block 68 to be either the pilot channel, a sync channel, paging channel or the IS-95 fundamental channel.

Referring again to FIG. 2A, Each of the twenty-four modems in the simple example of FIG. 2A includes three dedicated physical layer channels, for a total of 24×3=72 dedicated modem physical layer channels. The baseband data to be transmitted on a given antenna sector are routed by the connect block 25 to the appropriate transmit RF processing blocks 30. Each transmit RF processing block 30 typically consists of a transmit channelizer in which the signals are channelized (a process which achieves the required baseband pulse shape) at baseband, and a digital-to-analog converter which converts the digital signal to analogue format. An upconversion and filtering block up-converts the resulting signals to an IF (intermediate frequency) (at which time additional filtering is performed) and then to RF. The RF signals are amplified by an HPA (high power amplifier) and fed to the antenna for transmission over the air interface. A transmit filter is provided to limit spurious emissions from the HPA.

It is important to observe that in the conventional transmitter design, each modem is an independent resource which while being configurable in itself, does not have resources which can be combined with those of other modems. Furthermore, each modem is permanently designed to implement the physical layer channels of a particular standard, such as one of IS-95 or IS-95 3G for example. Additional modems would be required if both standards are to be handled.

Reverse Link CDMA Signal Processing

In the receive direction the signal processing functions performed by the BTS in a CDMA wireless network are as follows: diversity signal reception over the air interface and broadband filtering of signals received from the antennas, amplification of the received signals within the low noise amplifier (LNA), down-conversion and filtering, conversion of the received analogue signals to digital format, baseband channelization, matched filtering and automatic gain control (AGC), baseband demodulation, decoding and de-interleaving, and conversion of the received signals to T1/E1 packetised data format.

Figure 3A:
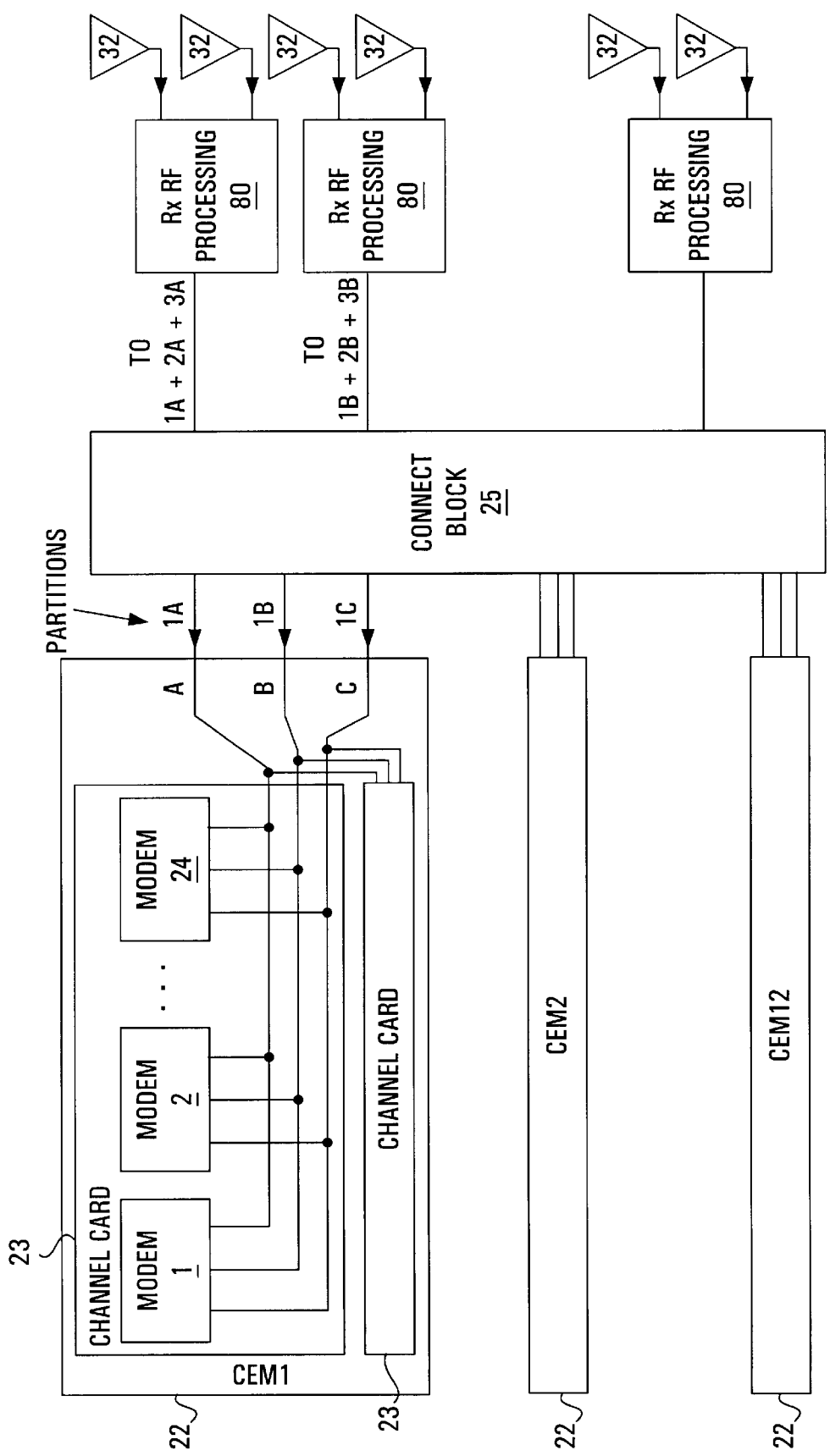
FIG. 3A is a block diagram of a conventional basestation receiver.
Figure 3B:
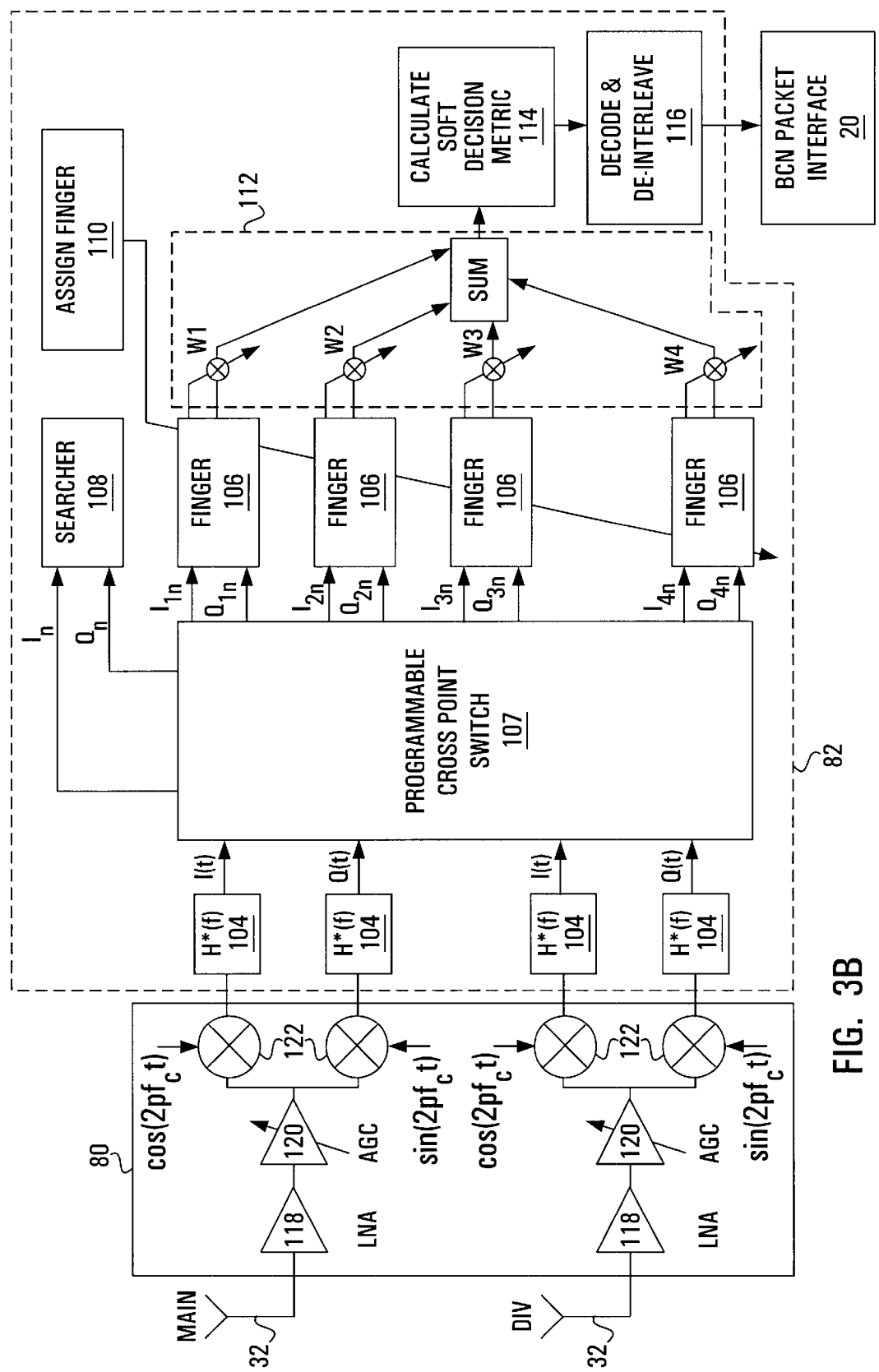
FIG. 3B is a block diagram of receive functionality of a conventional modem.

A complete conventional BTS receiver is depicted in FIG. 3A, and is very similar to FIG. 2A except that receive RF processing blocks 80 replace transmit RF processing blocks 30, and two diversity antennas 32 are used for each sector. The details of a single modem from a receive perspective are shown in FIG. 3B. Main and diversity antennas 32, are connected through receive RF processing block 80 to a demodulator whose functionality is included within dotted box 82. Matched filters 104 having I and Q outputs are connected to four finger blocks 106 through a programmable cross point switch 107 and to a searcher block 108. Any of the matched filter I/Q output pairs may be connected to the input of any of the four fingers 106. The searcher block 108 has an output connected to a finger assignment algorithm 110 which controls to which fingers the matched filter outputs are connected. The finger outputs are weighted and summed (in weight and sum block 112) before being processed to produce a soft decision metric (block 114). A decode and de-interleave block 116 performs the remaining receive processing and has an output connected to the BCN packet interface 20.

The RF signals received from the diversity pair of antennas 32 are passed to the receive RF processing block 80. The receive RF processing block 102 performs the complimentary task of converting received "raw" data to a format consistent with the BCN packet interface 20. The receive RF processing block 80 consists of a filter (forming part of a duplexer block, not shown), an LNA (low noise amplifier) 118, an AGC (automatic gain control) block 120, a down-conversion block 122, an analog to digital converter (not shown), and a receive channelizer (not shown).

Diversity signals received through the antennas 32 are initially filtered with the filter. The diversity signals are then amplified with the LNA 118. In the downconversion block 122, the signals are then down-converted to IF at which point preliminary broadband filtering takes place. The resulting signals are then digitized by sub-sampling with the analog to digital converter and are down-converted to baseband in the receive channelizer. The channelized signals are then processed by the matched filters 104 to yield I and Q signals for a particular channel.

The signals are then routed to the four fingers 106 and the searcher 108. Each finger comprises several demodulators (the demodulators are also referred to as de-correlators) which perform the function of de-correlation of the PN modulated signals. In addition the fingers perform fine adjustment of the delay and phase of the de-modulators to track time variation of signal multi-paths.

The weight and sum block 112 performs front end receiver signal processing functions on signals received from the fingers 106 and the searcher 108. It optimally combines the signal energy from the fingers within a Rake receiver.

The searcher 108 is made up from similar low level building blocks as the fingers 106. It performs the function of scanning the input data on specific antenna interfaces to identify candidate multi-paths which may be used within the demodulation process. The fundamental functions performed by the searcher are time compression, de-correlation, integration and comparison of candidate multi-path powers with a predetermined threshold.

The decode and de-interleave block 116 performs the functions of de-interleaving, Viterbi decoding, removal of overhead bits and CRC computation among others. All the blocks of FIG. 3B are duplicated for each pair of diversity antennas in conventional designs.

It is important to observe that in the conventional receiver architecture of FIG. 3B, while the fingers are each dynamically allocatable to either the main or diversity channel, should a particular connection require less than four fingers, the left over fingers are not available to other connections. Four fingers are permanently allocated to each connection. Furthermore, each finger is designed permanently to handle a particular standard, for example IS-95 and IS-95 3G. If different standards are to be handled, then additional dedicated fingers would be required.

Modular Modem Design

Figure 4A:
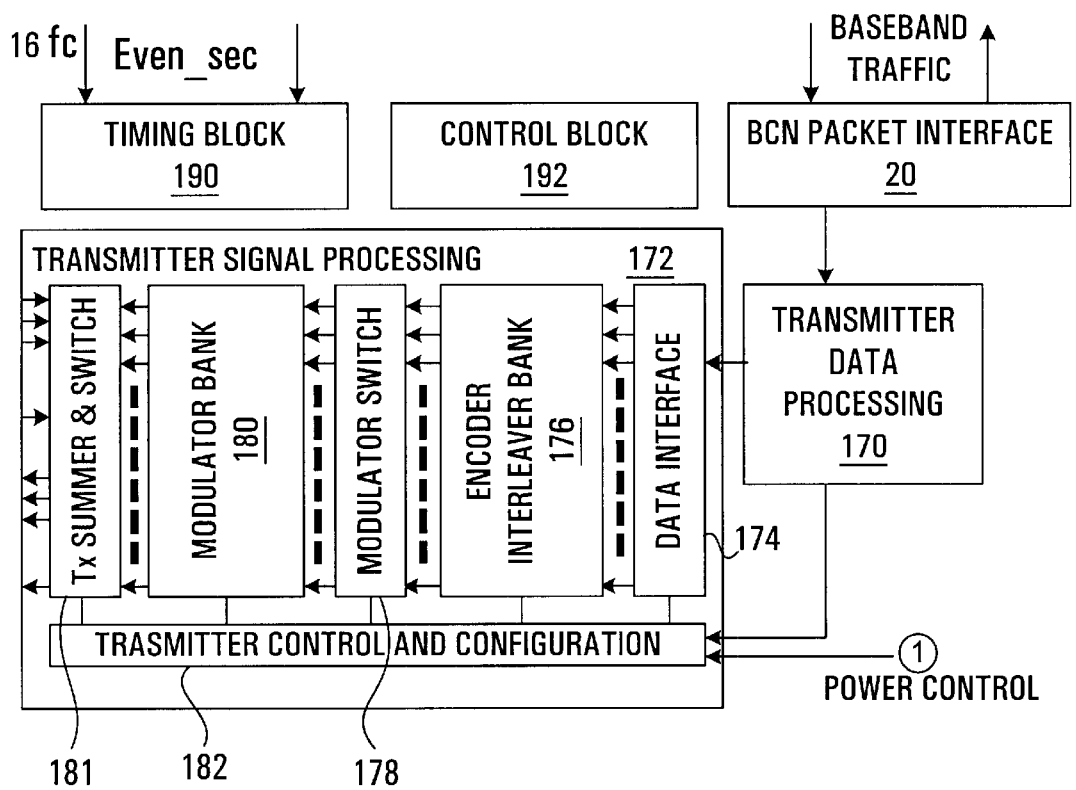
FIG. 4A is a block diagram of a transmit modem architecture according to an embodiment of the invention.
Figure 4B:
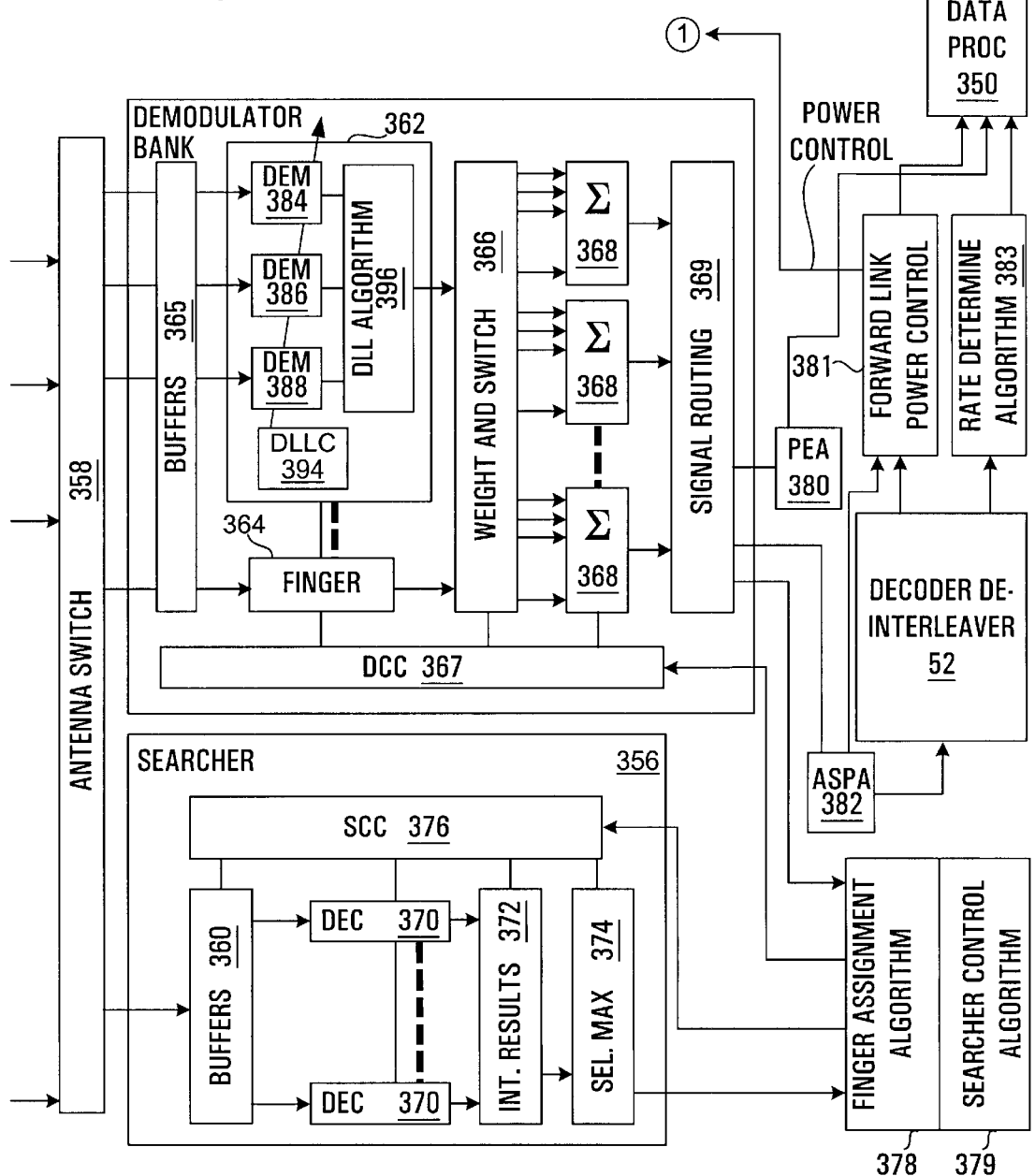
FIG. 4B is a block diagram of a receive modem architecture according to an embodiment of the invention.

Referring now to FIGS. 4A and 4B, a modem architecture according to an embodiment of the invention is shown. A transmit architecture according to an embodiment of the invention is shown in FIG. 4A, while a receive architecture according to an embodiment of the invention is shown in FIG. 4B. The modem will be described in the context of a particular design which performs the baseband signal processing function for both IS-95 and IS-95 3G narrowband standards. This example is designed to support up to eight standard 14.4 kbps voice calls simultaneously. In addition, this example can support higher data rate users and any overhead channels. As described in detail below, in order to support these features the modem has multiple parallel signal processing paths. Consequently, the individual processing elements most often perform a specific signal processing operation on several data paths simultaneously.

In addition to the parallel processing requirement another important feature of the modem is dual mode operation. Specifically, the modem supports any portion of IS-95 and IS-95 3G narrowband calls within the defined call mix. This means that not only the modem but also the individual processing elements are designed for dual mode operation.

The modem will first be described from a transmitter perspective with reference to FIGS. 4A, 5A–C, and will then be described from a receiver perspective with reference to FIGS. 4B and 6. Three components common to both the transmitter and receiver include the BCN packet interface 20, a timing block 190, and a control block 192. These are described in further detail below.

Transmitter Design

Referring firstly to FIG. 4A, at the highest level the transmitter elements include the previously introduced BCN packet interface 20, a transmitter data processing block 170, and a transmitter signal processing block 172. Furthermore, the conventional transmit RF processing blocks 30 and antenna sectors 32 shown in and described with respect to the conventional transmitter in FIG. 2A are also required, but these are not shown in FIG. 4A in the interest of simplifying the drawing.

The BCN packet interface 20 provides the physical data interface for the modem to the rest of the BTS. This functions the same as a conventional BCN packet interface. This data may be one of several types:

Baseband user traffic: This may be either voice or data and will be transmitted over the air via a fundamental or supplementary channel;

Signalling data to be transmitted over the air interface: Examples of this include paging and sync channel messages; and/or OA&M signalling for configuration and control of the modem itself: This data is not transmitted over the air-interface.

The BCN packet interface 20 performs address decoding, data format conversion and data buffering. Signals from the BCN interface are fed to the transmitter data processing block 170.

The transmitter data processing block 170 converts the data format received on the BCN packet interface 20 to a "raw" format which can be used directly within the transmitter signal processing block 172.

The transmitter signal processing block 172 performs all of the low level bit manipulation on raw data received from transmitter data processing block 170. It comprises a data interface 174, a programmable encoder/interleaver bank 176, a modulator switch 178, a programmable modulator bank 180, transmit summer and switch 181, and a transmitter control and configuration block 182.

The "raw" data from the transmitter data processing block 170 is fed through the data interface 174 to the encoder/interleaver bank 176. Within the encoder/interleaver bank 176 are a number of parallel encoder/interleavers which can service any of the channels supported within the call mix defined. The number of parallel encoder/interleavers in this block will determine the maximum number of concurrent calls which will be supported. For the purposes of this example, it will be assumed that there are eight parallel encoder/interleavers.

The encoder/interleaver outputs (a maximum of eight) are connected to the modulator switch 178. The modulator switch 178 contains a switch for each encoder/interleaver which can connect each encoder/interleaver output to one or more modulators within the modulator bank 180. The number of modulators which may be connected is a design parameter which will determine the maximum handoff size. For the purposes of this example, it will be assumed that the modulator switch 178 can connect each encoder/interleaver to up to a maximum of six modulators, thereby providing six way handoff capability.

The modulator bank 180 contains a plurality of individually configurable parallel modulators. The number of modulators included will have an effect upon the capacity of the transmitter. For the purposes of this example, it will be assumed that the modulator bank 180 contains twelve parallel modulators. It should be noted that to service six-way soft handoff for eight users simultaneously would necessitate 6×8=48 modulators. However, the modulator bank 180 may be dimensioned for more typical conditions in which most of the users are not involved in a handoff at any instant in time. With such a configuration, a single user does not have unlimited access to the six modulators required to perform six-way soft handoff. The number of modulators is minimized for a given statistical distribution of soft handoffs.

The transmitter control and configuration block 182 allocates the modulators within the modulator bank 180 to users on an "as required" basis and configures each encoder/interleaver and modulator to function as a particular type of physical layer channel, as instructed by the control block 192 as described in further detail below. This considerably reduces hardware but increases the probability of handoff blocking due to the inavailability of modulators. Twelve modulators are sufficient to service normal conditions with negligible increase in handoff blocking.

Within each modulator in the modulator bank 180 the processes of Walsh and PN spreading, signal power adjustment, and insertion of power control bits are performed. The design of each modulator in the modulator bank 80 is described in further detail below with respect to FIG. 5C.

The signals output by the modulator bank 180 are fed to the transmitter summer and switch 181 which switches each specific modulator output to a specific antenna interface and sums together all modulated signals destined for any particular antenna. In addition the transmit summer and switch block 181 performs daisy chain addition of signals from any previous modem which may exist within the chain.

The modem preferably does not perform baseband transmitter filtering. Output from the modem antenna interface is at the chip rate. At this point the modem outputs are fed to the otherwise conventional RF processing block (not shown) which has been enhanced to perform baseband filtering.

Referring now to FIG. 5A, the details of a single encoder/interleaver in the encoder/interleaver bank 176 of FIG. 4A will be described. In the preferred embodiment, the functionality of FIG. 5A will be replicated eight times. The encoder/interleaver is comprised of eight blocks connected in sequence each of which is individually configurable and is also individually bypassable as required to satisfy a given encoder/interleaver's requirements. The blocks consist of the following: "add reserved bits" 220, "add CRC" 222, "add encoder tail" 224, "convolutional encoder" 226, "symbol repetition" 228, "symbol deletion" 230, "block interleaver" 232, and "long code modulation" 234. By way of example, tables A1,A2,B1,B2,C1 and C2 below show how each of the blocks in FIG. 5A would need to be configured for each type of physical layer channel. Tables A1 and A2 are for IS-95 3G traffic channel configurations, and tables B1 and B2 are for IS-95 traffic channel configurations. Tables C1 and C2 show the configuration for the pilot, sync and paging channels for both IS-95 and IS-95 3G. The blocks include the functions required to implement both IS-95 and IS-95 3G encoder/interleaver functionality.

TABLE A1

IS-95 3G Standard

| Physical Layer Channel | Number of Reserved Bits | CRC Length (bits) | Encoder Tail Length (bits) | Convolutional Encoder Rate (k = 9) |
|---|---|---|---|---|
| RS1, Full Rate | | 12 | 8 | r = 1/2 |
| RS1, Half Rate | | 8 | | |
| RS1, Quarter Rate | | 6 | | |
| RS1, Eighth Rate | | 6 | | |
| RS2, Full Rate | 1 | 12 | 8 | r = 3/8 |
| RS2, Half Rate | | 10 | | |
| RS2, Quarter Rate | | 8 | | |
| RS2, Eighth Rate | | 6 | | |
| Supplemental, 21, 45, 93, 189, 381, 765 octets/frame | | 16 | 8 | r = 1/2 |
| Supplemental, 33, 69, 141, 286, 573 octets/frame | | | | r = 3/8 |

TABLE A2

IS-95 3G Standard

| Physical Layer Channel | Symbol Repetition | Symbol Deletion (every $n^{th}$ symbol) | Block Interleaver | Long Code Scrambler |
|---|---|---|---|---|
| RS1, Full Rate | | | yes | no |
| RS1, Half Rate | 2 | | | |
| RS1, Quarter Rate | 4 | 9th | | |
| RS1, Eighth rate | 8 | 5th | | |
| RS2, Full Rate | | | yes | |
| RS2, Half Rate | 2 | | | |
| RS2, Quarter Rate | 4 | | | |
| RS2, Eighth Rate | 8 | | | |
| Supplemental 21, 45, 93, 189, 381765 octets/frame | | | yes | |
| Supplemental 33, 69, 141, 286, 573 octets/frame | | | yes | |

TABLE B1

IS-95 Standard

| Physical Layer Channel | Number of Reserved Bits | CRC Length (bits) | Encoder Tail Length (bits) | Convolutional Encoder Rate (k = 9) |
|---|---|---|---|---|
| RS1, Full Rate | | 12 | 8 | r = 1/2 |
| RS1, Half Rate | | 8 | | |
| RS1, Quarter Rate | | 0 | | |
| RS1, Eighth Rate | | 6 | | |

TABLE B1-continued

IS-95 Standard

| Physical Layer Channel | Number of Reserved Bits | CRC Length (bits) | Encoder Tail Length (bits) | Convolutional Encoder Rate (k = 9) |
|---|---|---|---|---|
| RS2, Full Rate | | 12 | 8 | |
| RS2, Half Rate | | 10 | | |
| RS2, Quarter Rate | | 8 | | |
| RS2, Eighth Rate | | 6 | | |

TABLE B2

IS-95 Standard

| Physical Layer Channel | Symbol Repetition | Symbol Deletion (every $n^{th}$ symbol) | Block Interleaver | Long Code Scrambler |
|---|---|---|---|---|
| RS1, Full Rate | | | yes | yes |
| RS1, Half Rate | 2 | | | |
| RS1, Quarter Rate | 4 | | | |
| RS1, Eighth rate | 8 | | | |
| RS2, Full Rate | | Delete | | yes |
| RS2, Half Rate | 2 | Of every | | |
| RS2, Quarter Rate | 4 | 6 inputs | | |
| RS2, Eighth Rate | 8 | | | |

TABLE C1

IS-95 and IS-95 3G Standards

| Physical Layer Channel | Number of Reserved Bits | CRC Length (bits) | Encoder Tail Length (bits) | Convolutional Encoder Rate (k = 9) |
|---|---|---|---|---|
| Pilot | Encoder/Interleaver not used | | | |
| Sync | | | | r = 1/2 |
| Paging | | | | |

TABLE C2

IS-95 and IS-95 Standards

| Physical Layer Channel | Symbol Repetition | Symbol Deletion (every $n^{th}$ symbol) | Block Interleaver | Long Code Scrambler |
|---|---|---|---|---|
| Pilot | Encoder/Interleaver not used | | | |
| Sync | 2 | | yes | no |
| Paging | 1 or 2 | | | yes |

By way of example, FIG. 5B shows an encoder/interleaver configuration for a rate set 2, full rate, IS-95 3G traffic channel. In this example, the "add reserved bits" block 220 has been configured to add a single bit, the "add CRC" block 222 has been configured to compute and add a 12 bit CRC, the "add encoder tail" block 224 has been configured to add an 8 bit encoder tail, the "convolutional encoder" block 226 has been configured with r=½ and k=9, the "symbol repetition" 228 and "symbol deletion" blocks 230 have been bypassed, as has the "long code modulation" block 234.

Figure 5C:
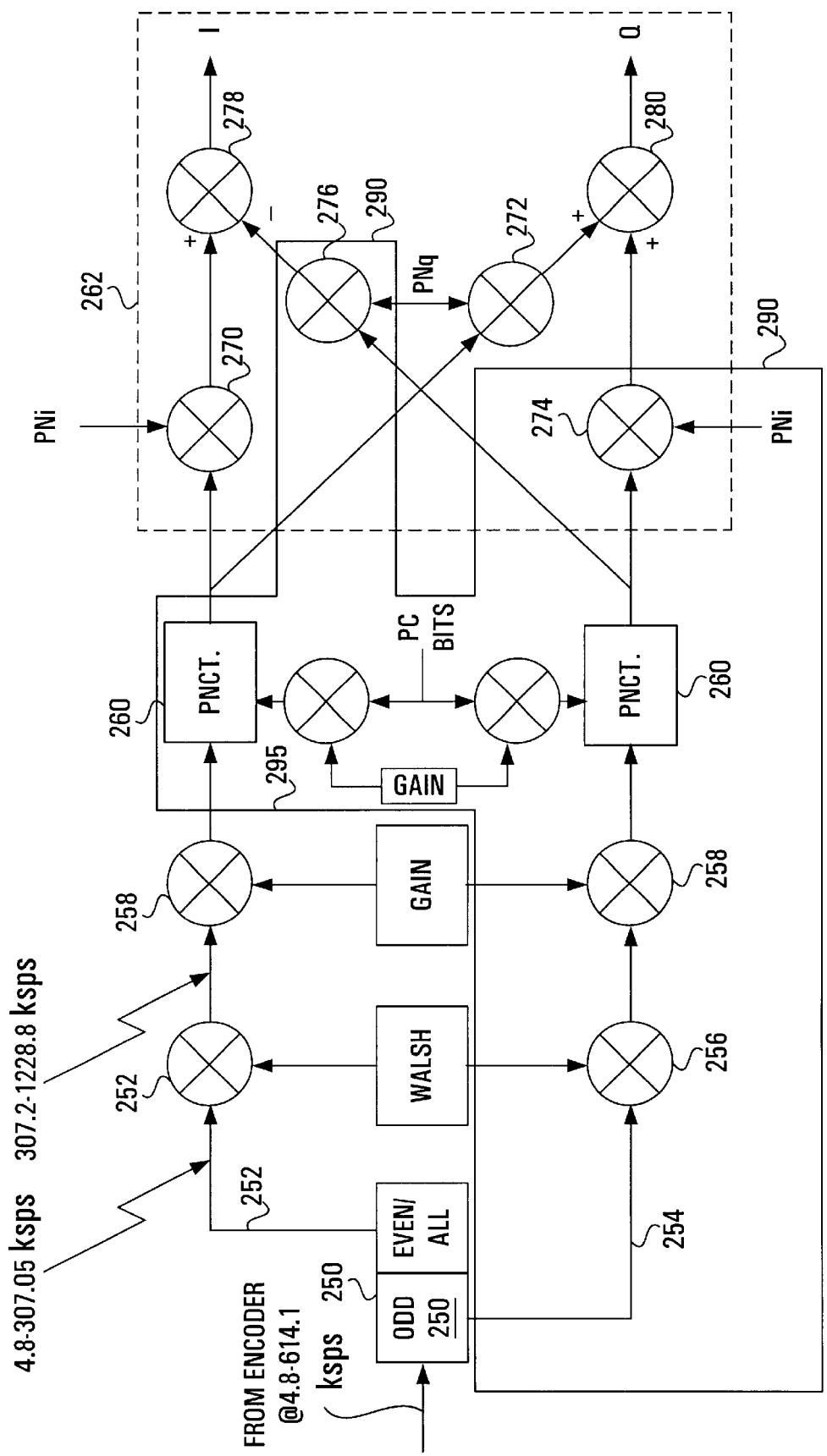
FIG. 5C is a schematic of a modulator for use in the transmit modem architecture of FIG. 4A according to an embodiment of the invention.

Referring now to FIG. 5C, the details of a single modulator in the modulator bank 180 of FIG. 4A will be described. In the preferred embodiment, the functionality of FIG. 5C will be replicated twelve times.

The modulator of FIG. 5C is designed to be able to function in both IS-95 and IS-95 3G mode. The modulator will first be described as it would be configured for IS-95 3G in which case all of the components of FIG. 5C are active. An odd/even splitter 250 takes every even symbol received from the encoder/interleaver and sends it along a first path 252, and takes every odd symbol received and sends it along a second path 254. The two paths 252,254 each contain functionality which is configurable to contain half the functionality of a QPSK (quaternary phase shift keying) modulator. In addition, as described in detail below, path 252 includes functionality which is configurable to function as a BPSK modulator. Both paths include a digital gain function 258, PC puncture block 260, followed by a Walsh function 252 and PN spreading block 262. The PN spreading block 262 includes PNi and PNq spreading elements 270,272 on the first path, and PNi and PNq spreading elements 274,276 on the second path. The PNi spreaded signal from the first path is combined in an adder 278 with the PNq spreaded signal from the second path, and similarly, the PNi spreaded signal from the second path is combined in an adder 280 with the PNq spreaded signal from the first path. The Walsh code block 252, the gain block 258, the PC puncture block 258, and the PN spreading block 262 are each configurable to function in various capacities, and preferably for each different physical layer channel type provided within IS-95 3G.

Figure 5D:
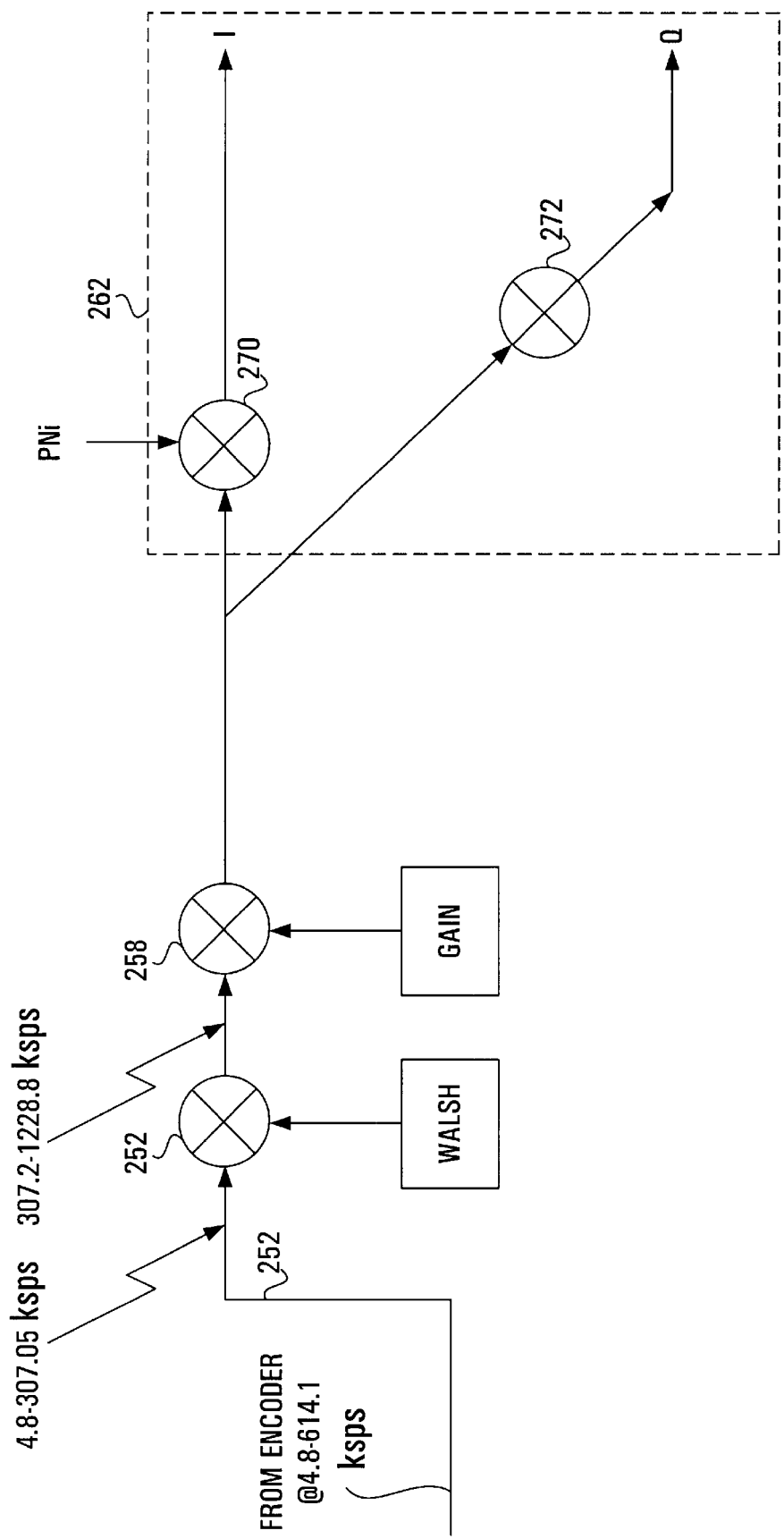
FIG. 5D is a schematic of the modulator of FIG. 5C configured for IS-95.

To function in IS-95 mode, the odd/even splitter 250 is configured as a pass through in which case the signal from the encoder is only passed to the first path 252. In this case, the first path 252 is configured to contain the functionality of a BPSK (binary phase shift keying) modulator. In addition, the PC puncture block 260, the Walsh block 256, the gain block 258, and the PN spreading block 262 are all configured to function as a particular IS-95 physical layer channel type. In this case, the functionality within the box 290 is deactivated, and the adders 278,280 receive only a single active input and as such also have no effect. A version of FIG. 5C with inactive or bypassed components not shown is illustrated in FIG. 5D, this being the required configuration for IS-95.

Each combination of a modulator in the modulator bank 180 of FIG. 4A and an encoder/interleaver in the encoder/interleaver bank 176 of FIG. 4A is designed to be configurable to behave as a complete one of several different physical layer channels.

Receiver Design

Referring now to FIG. 4B, the highest level components of the BTS receiver include the previously introduced BCN packet interface 20, a receive data processing block 350, a decoder/de-interleaver bank 352, a demodulator bank 354, a searcher block 356, and an antenna switch 358. Furthermore, conventional receiver matched filters 104 are connected to the antenna switch 358, and the receive RF processing blocks 80, and antennas 32 shown in and described with respect to the conventional receiver of FIG. 3B are also required, but these are not shown in FIG. 4B in the interest of simplifying the drawing. In FIG. 4B, abbreviations have been used for a more compact representation. These abbreviations will be identified once in the description in brackets, but not used otherwise.

The demodulator bank 354 comprises a plurality of fingers 362,364 which are each connectable to any of the antenna inputs by the appropriate configuration of the antenna switch 358. For the purposes of our example, it will be assumed that there are 24 fingers; an average of three per channel. The signals may be buffered in a buffer block 365. Each finger has an output connected to a weight and switch block 366 which directs one or more finger outputs to each of a plurality of summers 368. The outputs of the summers 368 are passed to a signal routing block 369 which produces the demodulator bank's 354 output. A demodulator control and configuration block (DCC) 367 controls the fingers 362,364, the weight and switch block 166, and the summers 368 as instructed by the control block 192 as described in further detail below.

The searcher block 356 comprises a plurality of decorrelators (DEC) 370 which are connectable through buffers 360 to any of the antenna inputs by the appropriate configuration of the antenna switch 158. The decorrelators 370 are connected to an "integrate results" block (INT. RESULTS) 172, and a "select maximum" block (SEL.MAX) 374. The searcher block 356 is configured with a searcher control and configuration block (SCC) 376. The functionality of the searcher is described in further detail below with respect to FIG. 6.

The control block 192 runs a finger assignment algorithm 378 and a searcher control algorithm 379 to control the searcher 356 and to determine which fingers to assign to which antenna inputs through the searcher control and configuration block 376 and the demodulator control and configuration block 367 respectively.

The searcher 356 looks at a portion of an entire time window to be searched and performs a search on that portion to yield search results. The searcher 356 knows which calls are in progress and searches specifically for multipaths for those calls. The results are compiled (integrate results block 372) after which a best estimate of the multipath and/or access attempt is selected. This selection is handled by the "select maximum" block 374. The searcher produces a list of multipaths for each call and may also include the strengths of the multipaths. The finger assignment algorithm 378 then allocates the fingers to multipaths identified by the searcher. The manner in which this is done is a design consideration. It may be subject to various constraints such as always allocating at least two fingers per active call. While in conventional designs, there are four fingers permanently allocated per call, in this design, there may be for example 24 fingers which are dynamically allocatable to eight calls, i.e. an average of three fingers per call. Calls are subject to blocking if there are no fingers available. Any finger assignment algorithm should minimize or eliminate this possibility.

Each finger 362,364 comprises three demodulators (DEM) 384,386,388, a delay locked loop algorithm (DLL ALGORITHM) 396 and a delay locked loop control block (DLLC) 394. The three demodulators 384,386,388 are configured to process delayed versions of the same input data (the demodulators are referred to as early, on-time and late). Typically a delay of ½ a chip between demodulators 384, 386, 388 is used. At the input to each demodulator the signals are interpolated to 8 fc and delayed by an amount appropriate to that demodulator. As described in further detail below, each demodulator can perform either IS-95 or IS-95 3G narrowband de-correlation. The early and late demodulator outputs are then processed within the delay locked loop algorithm 396. A delay locked loop output is used for delay adjustment of the demodulators to perform timing of arrival tracking of the multi-path.

Figure 6A:
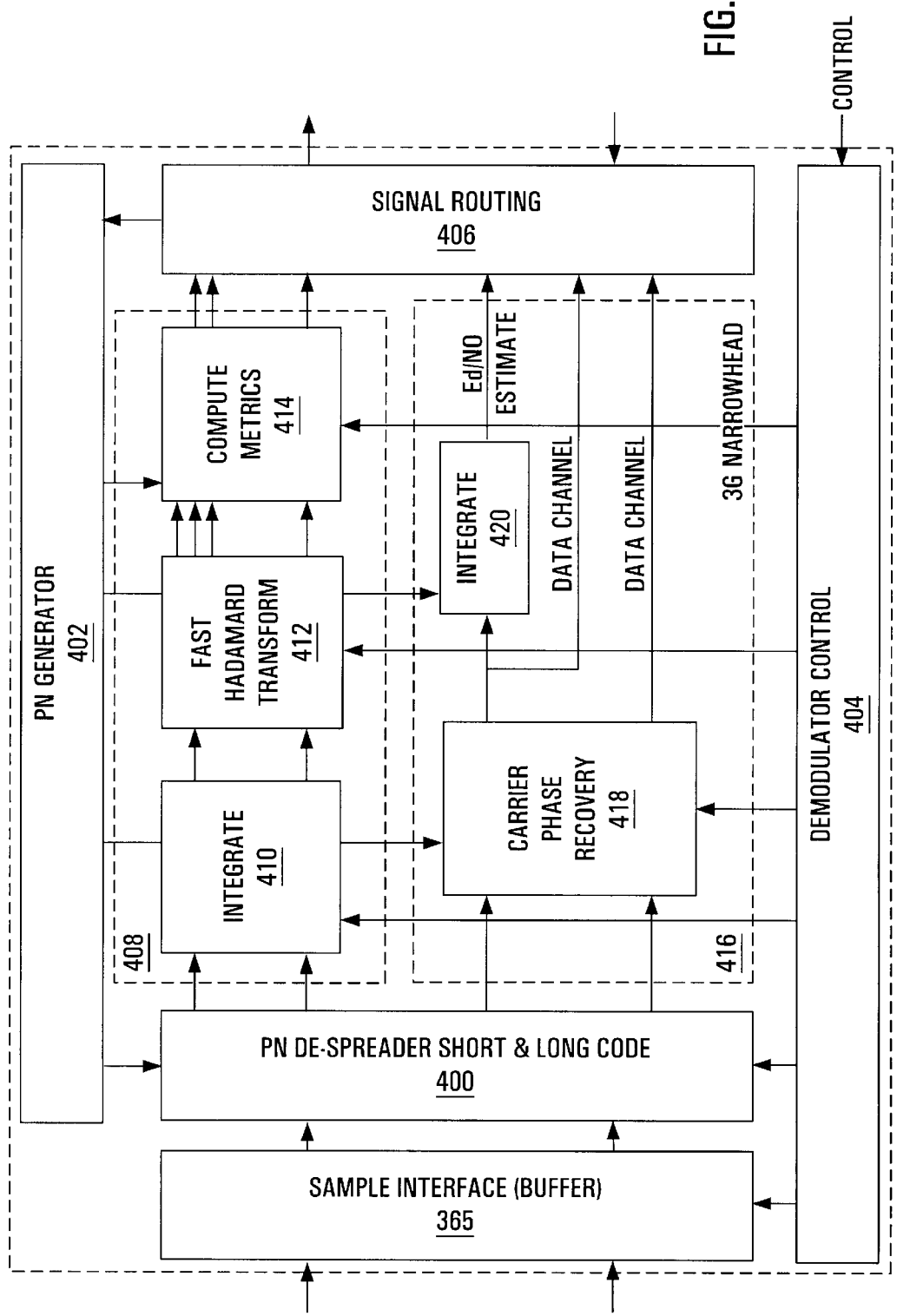
FIG. 6A is a block diagram of a single finger for use in a modulator of FIG. 4B, according to an embodiment of the invention.

A preferred embodiment of a single demodulator for use in a finger 362,364 of FIG. 4 is shown in block diagram form in FIG. 6A which includes functionality which allows the demodulator to perform either IS-95 or IS-95 3G de-modulation. The blocks which are common to both standards are the sample interface (buffer) 365, PN despreader 400 (short and long code as required), the PN generator 402, the demodulator control 404, and a signal routing block 406. For IS-95, the blocks in dotted box 408 are activated, these including integrate 410, FHT (fast Hadamard transform) 412, and compute metrics blocks 414. For IS-95 3G, the blocks in dotted box 416 are activated, these being carrier phase recovery 418 and integrate 420. The PN generator block 402 generates PN codes for both the IS-95 and 3G functions in the block. The PN despreader block 400 performs short and long code PN despreading for both the IS-95 and 3G functions in the block. The Carrier Phase Recovery block 418 recovers the carrier phase for coherent detection of the 3G channel. The Integrate 3G block 420 integrates over several chip periods to get an estimate of the reverse link pilot signal. Integrate (IS-95 block) 410 integrates to recover the Walsh symbols. The FHT block 412 determines which Walsh symbol was sent by the mobile. The compute metrics block 414 computes the soft metrics that will be supplied to the decoder. The demodulator control block 404 controls and configures the demodulator block. The demodulator is either configured for one of IS-95 or 3G operation, but not both at the same time.

Referring again to FIG. 4B, finger and searcher resources are allocated to a particular user on an "as required" basis by the finger assignment algorithm 378 and the searcher control algorithm 379. Most often only two fingers per user will be allocated. However, additional fingers are available for additional multipaths if required. There are eight parallel summers 368 and hence the modem can support a maximum of eight Rake receivers. Additional signal processing algorithm (ASPA) and performance estimation algorithms (PEA) are performed by blocks 382,380. There are two outputs from the fingers, namely data and channel metrics. The data goes to the summers 368 and the channel metrics are fed to the finger assignment algorithm 378, the performance estimation algorithm 380 and the additional signal processing algorithm 382. The main data path is through the additional signal processing block 382; the other blocks being used for control and OA&M purposes. The additional signal processing algorithms comprise integration, non-linear weighting and quantizing of the data. After these processes have been performed the signal is fed to the decoder/de-interleaver bank 352. Each of these blocks can service any of the reverse link channels defined earlier with up to eight parallel processing paths. In addition, the additional signal processing algorithm 382 has an output connected to a forward link power-control block 381 which functions conventionally, having an output which is fed back to the transmitter control and configuration block 182 of FIG. 4A.

The decoder/de-interleaver bank 352 performs de-interleaving and Viterbi decoding on each of the channels. The functionality for each channel can be configured to support the various physical layer channels. The blocks of each the decoder/de-interleaver in the bank 352 consist of the inverse of the blocks shown in FIG. 5A connected in reverse order. More particularly, each decoder/de-interleaver comprises a long code demodulation block, a block de-interleaver block, a symbol integration block, a convolutional decoder block, a remove encoder tail block, a remove and check CRC block, and a remove reserved bits block. Each of these blocks will be configured to match the configuration of the forward link channel configuration. The decoder/de-interleaver is allocated and configured together with a corresponding encoder/interleaver. The outputs of blocks 352 are fed to a rate determine algorithm 383.

The decoder/de-interleaver output is then used to determine the data rate on which the terminal is transmitting (in the rate determine algorithm 383). The output of the rate determine algorithm 383 (this being the actual demodulated data at the correct rate) is fed to the receive data processing block 350. The receive data processing block 150 formats the data to be consistent with the BCN packet interface 20. The resulting data are then converted to physical BCN packets for transmission over the BTS backhaul.

The performance estimation block 380 computes Eb/No, SER, FER, etc. This data is used internally within the modem for control purposes (as described above) but may also be made available externally for performance monitoring purposes. The finger assignment algorithm 378 determines, from the search results and the finger Eb/No data, whether any finger should be assigned, re-assigned, or de-assigned. An algorithm closely identified with the finger assignment algorithm is the searcher control algorithm 379. This algorithm determines which signal space the searcher 356 should be operating within at any particular time.

The fingers 362, 364 are assigned to demodulate data received on specific individual multipaths. Synchronization of the fingers is performed at two levels. Initial assignment is performed by the combination of the output of the searcher 356 and the finger assignment algorithm 378 run by the control block 192. The searcher 356, which is effectively a bank of de-correlators, performs the function of identifying new multi-paths and the finger assignment algorithm 378 determines whether the new paths should be used for demodulation. Fine adjustment is performed in each finger by the delay locked loop arrangement 394,396. The outputs of all fingers 362, 364 allocated to any particular user are then optimally combined in the weight and switch block 366 and the summers 368, and once combined the signals are decoded and de-interleaved. A reverse link channel may be allocated to one or more of the following types of physical layer channels: access channel, reverse link pilot channel, control channel, IS-95 fundamental channel, IS-95 3G supplemental channel, for example. The precise signal processing functions performed varies depending upon which physical channel is under consideration. Decoded data are then formatted and routed to the T1/E1 interface.

The receiver implements high level signal processing algorithms which include de-correlation rate determination, forward link power control, system performance analysis Eb/No etc.) and modem directed fast softhand off.

The receiver implements dynamic resource allocation algorithms which include finger assignment, searcher control and low level resource management. These algorithms efficiently schedule and assign the key modem resources to new calls and the calls in progress.

Receiver Signal Flow

Figure 6B:
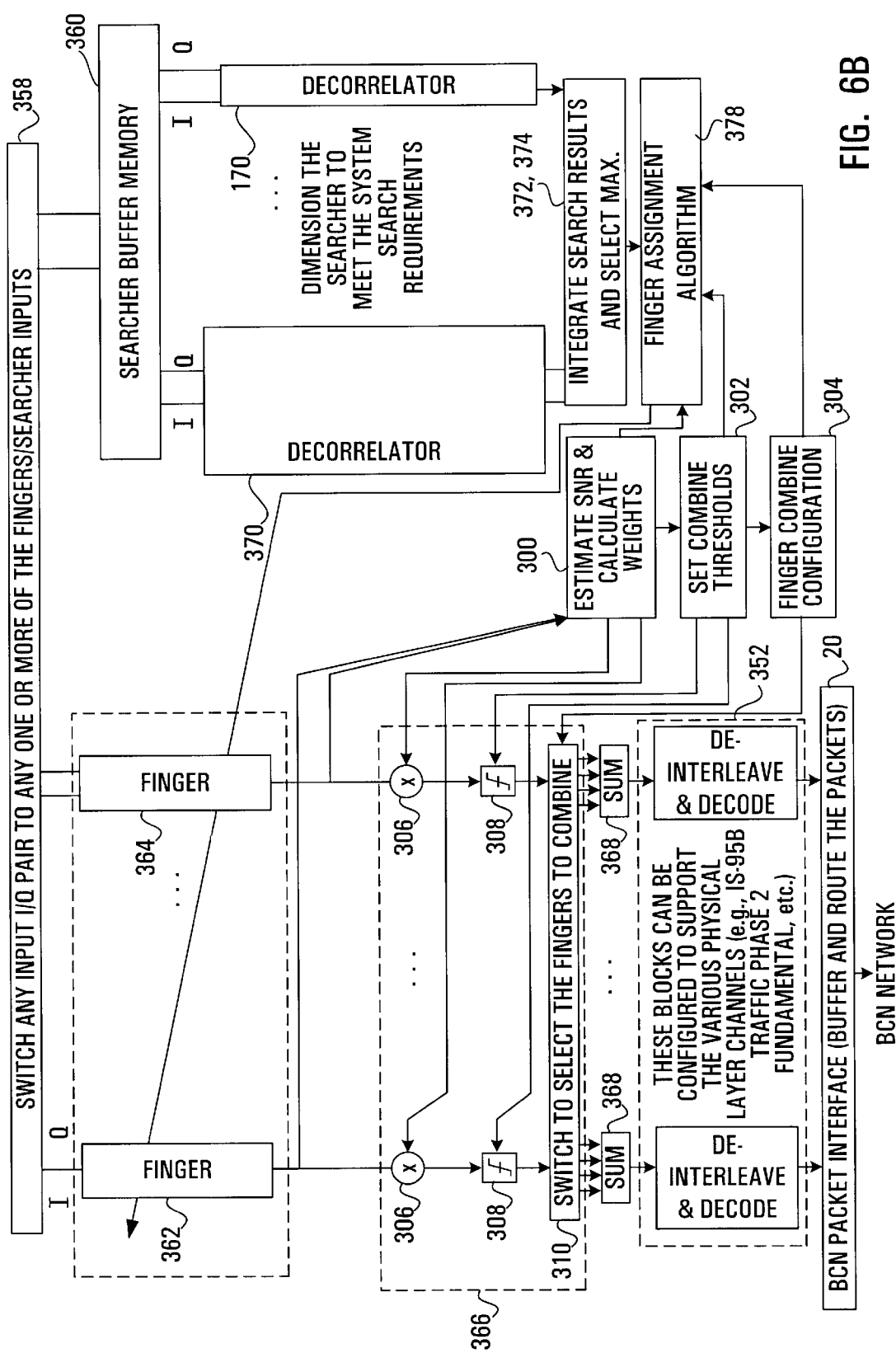
FIG. 6B is a process flow diagram of the receiver functionality of the receive modem architecture of FIG. 4B.

The operation of the receiver design of FIG. 4B will be described with reference to the processing view of FIG. 6B. To begin, signals are received by the antennas and subjected to receive RF processing and matched filtering thereby producing CDMA baseband data signals received at the twelve antenna interfaces. The data comprises I and Q paths sampled at a rate of 2 fc with 4 bits per sample. The antenna reception, receive RF processing and matched filtering are not shown in FIG. 6B as those are conventional. The antenna switch 358 switches the data from a specific antenna interface to one or more specific fingers 362,364.

At the same time, the samples are fed to the searcher buffer memory 360 and subsequently to one of the decorrelators 370. The decorrelator outputs are integrated and the outputs which exceed a set threshold are selected (372,374).

The results are fed to the finger assignment algorithm 378 which controls which fingers are connected to which antenna inputs through switch 358. The finger outputs are used to estimate the signal SNR and to calculate weights (300) which are then multiplied by the finger outputs using multipliers 306. These weighted values are thresholded in threshold blocks 308 which have their combine thresholds set as a function of the estimated SNRs and weights. Switch 310 switches the thresholded values to an appropriate summer 368. The summed outputs are de-interleaved and decoded in an appropriate channel of the decoder/de-interleaver bank 352 and passed to the BCN packet interface 20 for transmission over the BCN packet network. Optionally, the steps "set combine thresholds" (302) and "control finger combine configuration" (304) may be executed.

Non Signal Path Modem Functions

In addition to the signal processing functions described previously the modem also performs many control and timing related functions. To perform these functions, in addition to components specific to the transmitter and receiver, the modem architecture of FIG. 4 includes the control block 192 which manages all resources within the modem and also performs data transfer, and the timing block 190 which provides timing and synchronization signals for all components within the modem. The functions implemented by these blocks can be grouped in the following categories:

Call Processing: This is concerned with setting-up and tearing down calls. It comprises configuration of the modem resources in order to service externally generated call requests. In order to do this the controller must have knowledge of the call request details and current modem status.

Internal Data Transfer: This aspect is concerned with routing the data to be processed within the modem between functional blocks.

Dynamic Modem Resources Management: Dynamic resource control is required to allocate resources such as fingers, modulators, searchers etc. to users as they are required. This requires knowledge of both modem and signal environment status. This is described in further detail below.

Static Modem Resource Management: This aspect includes fault management, performance management, test management and status reporting.

Timing Generation: This is concerned with the generation of all necessary timing signals within the Modem.

These functions are performed with the control block 192 and the timing block 190. Within the functional diagram no connections are shown to these blocks in the interest of simplicity. However in an actual implementation, the control and timing blocks 192,190 will be connected to most functional elements. In general the functions of the control and timing generation tend to be related closely to the particular implementation.

Dynamic Resource Management

Dynamic resource management is used to assign the modem resources to physical layer channels as required at the request of the control block 192. It takes place on both the forward link (transmitter) and the reverse link (receiver). The principle reason for implementing dynamic resource management is to efficiently allocate the limited modem resources to new calls and calls in progress.

The dynamic resource management algorithms are run on the control block 192 for the transmitter and the receiver are described in the following paragraphs.

Transmitter Dynamic Resource Allocation

The four transmitter blocks controlled by the dynamic resource allocation algorithm are the transmit summer and switch 181, the modulators in the modulator bank 180, the modulator switch 178, the encoder/interleaver bank 176, and the data interface 174. The transmit summer and switch 181 sums modulator outputs and routes the sum to the designated antenna. The modulators perform the short code, long code, and Walsh code spreading of the signal. The modulator switch routes the outputs of the encoder/interleavers to the appropriate modulators. More than one modulator can be connected to a single encoder/interleaver. This enables N-way soft handoff by connecting N modulators to a single encoder/interleaver. The encoder/interleavers perform the convolutional encoding and block interleaving of the user's data stream. And finally, the data interface routes the incoming data packets to the appropriate encoder/interleaver.

The entire transmitter signal processing block 72 is configured by the control block 192 every 20 ms CDMA traffic frame. The operation of this block proceeds as follows:

1. The control block 192 sends the configuration for the next traffic frame to the transmitter control and configuration block 182. The current traffic frame is being processed using the configuration sent by the control block during the last traffic frame. The control block determines the required transmitter configuration by monitoring the incoming traffic data. The control block 192 knows the previous state, and is told by an external controller about new calls to be set-up. It configures the hardware to maintain the current calls, accommodate new calls, and accommodate changes to current calls.

2. While the current frame is being processed, the control block 192 loads the next frame's data into the transmitter.

3. Upon receipt of the framing pulse, the transmitter control and configuration block 182 switches the data interface 174, encoder/interleaver bank 176, modulator switch 178, modulator bank 180, and transmit summer and switch 181 to the new configuration and starts transmitting the new frame data.

The control block 192 determines how to configure the modem resources to meet the requirements of the incoming traffic for the next traffic frame and preferably does so once per frame. This resource allocation is worked out in conjunction with the BTS resource manager to meet the resourcing requirements of the entire BTS. The BTS will not request modem resources that are not available in the next traffic frame. There is a call admission algorithm at the BTS level that knows if the resources required to support a call are available at the modem level. With this algorithm, the modem will never operate in a call blocking state since the BTS manages the call admission to the modem.

In a soft handoff scenario, the transmitter is configured such that more than one modulator is assigned to a single encoder/interleaver. Before a call enters into soft handoff, the modulator resource is requested and the BTS determines if there are any modulators available on the transmitter that is supporting the call. If modulators are available, the BTS allocates the required modulators to the call and instructs the control block 192 to configure the transmitter for soft handoff in the next frame. If no modulators are available, the call is not allowed to enter into soft handoff. The number of modulators in the transmitter is designed such that the probability of blocking a call from entering into soft handoff is minimized. The ratio of modulators to encoders/interleavers needed to support N-way handoff for all users simultaneously would be N. However, statistically, not all users would be in a handoff at the same time. For example, if 2-way handoff is to be supported, maybe only a maximum of 50% of users will be in a handoff in which case a ratio of 1.5 could be used, this being the value used in the above described example. This does not mean that this transmitter cannot support more than 2-way handoff. It can support 3-way, 4-way, or more provided the maximum expected number of encoder/interleaver calls do not request soft handoff at the same time. In practice only a subset of the calls are in soft handoff at any on time.

Receiver Dynamic Resource Allocation

On the receiver side the demodulator bank 354 and the decoder/de-interleaver bank 352 are the primary resources that are dynamically allocated to calls. They are both configured for calls by the control block 192, but the requirements for configuration are different than those used by the transmitter.

The decoder/de-interleaver bank 352 contains the same number of signal paths as the encoder/interleaver bank 176 in the transmitter. The dimensioning is balanced for these processing blocks. Since in our example the transmitter can support eight calls with eight encoder/interleavers, the receiver should contain eight de-interleaver/decoders. When an encoder/interleaver is allocated in the transmitter, a corresponding de-interleaver/decoder is allocated in the receiver.

The demodulator fingers 362,364 are allocated by the finger assignment algorithm 378 running on the control block 192. This algorithm uses the results of the searcher block 356 as inputs to determine which multipath components should be tracked and demodulated by the demodulator fingers 362,364. The process is not aligned with the transmitter. Fingers are assigned when required as determined by the finger assignment algorithm 378.

The receiver does not play a role in call admission. Only the resources available in the transmitter determine if a call can be admitted to the modem. The receiver is dimensioned such that it can support the maximum number of calls that can be accepted by the transmitter.

Economies of scale are achieved in the receiver by sharing demodulator fingers across several calls. For a typical call, the number of fingers required varies as the channel conditions change, and channel conditions are different for every call. When one user requires several fingers another user may only require one or two fingers. Some time later the requirements will change and the user who previously required several fingers may only require a few fingers while the user who previously required a few fingers may then require several fingers. By sharing fingers across several users, it is possible to design a demodulator bank with fewer total fingers than a demodulator bank including a dedicated demodulator for each user.

Glossary Terms

BCN—Basestation Communications Network. The packet network internal to the BTS and BSC that carries baseband data.

BTS—Basestation Transceiver Subsystem. The CDMA network component the converts the BCN packets to and from the CDMA air interface standard.

CDMA—Code Division Multiple Access. An air interface multiple access scheme in which users are distinguished from each other by different codes. All users share the same frequency and time space.

IS-95—The current CDMA standard.

IS-95 3G—The future evolved CDMA standard that will support high speed data services over the air interface.

Numerous modifications and variations of the present invention are possible in light of the above teachings. It is therefore to be understood that within the scope of the appended claims, the invention may be practised otherwise than as specifically described herein.

We claim:

1. A CDMA transmitter signal processing apparatus comprising:

an encoder/interleaver bank having a plurality of encoder/interleavers each having an input and an output;

a modulator bank comprising a plurality of modulators each having an input and an output, wherein each modulator is dynamically configurable to service signals adhering to one of several different standards and wherein each modulator comprises:

a first modulator path containing BPSK modulation functions and functions for a first half of a QPSK modulator;

a second modulator path containing functions for a second half of a QPSK modulator; and input routing circuitry switchable between a first state and a second state, which when in said first state routes entire received bit streams to the first modulator path thereby causing the configurable modulator to function in a BPSK mode, and when in said second state routes the received bit streams to said first path and to said second path thereby causing the configurable modulator to function in a QPSK mode;

a modulator switch for connecting any encoder/interleaver output to any one or more modulator inputs;

a plurality of summers each having a respective plurality of inputs and an output; and an output switch for connecting any modulator outputs to any summer input.

2. An apparatus according to claim 1 wherein said input routing circuitry when in said second state routes every odd bit to said second path and routes every even bit to said first path.

3. An apparatus according to claim 2 wherein:

when in said first state, the modulator includes Walsh, Gain, and PNi and PNq spreading functions which operate on said first path to produce I and Q outputs;

when in said second state, the modulator includes Walsh, Gain, and power control functions in each of said first and second paths, and includes PNi and PNq spreading functions which perform PNi spreading on each of said first and second paths and PNq spreading on each of said first and second paths, and combiners which combine a PNi spread output of the first path with a PNq spread output of the second path and which combine a PNi spread output of the second path with a PNq spread output of the first path.

4. A CDMA transmitter signal processing apparatus comprising:

an encoder/interleaver bank having a plurality of encoder/interleavers each having an input and an output, wherein each encoder/interleaver is dynamically configurable to service signals adhering to one of several different standards and further comprising a data interface for connecting any one of the plurality of data inputs to a respective input of one of the encoder/interleavers and wherein each configurable encoder/interleaver comprises:

an add reserved bits block;

an add CRC block;

an add encoder tail block;

a convolutional encoder block;

a symbol repetition block;
a symbol deletion block;
a block interleaver block; and
a long code modulation block;
wherein each block of the encoder/interleaver is individually configurable and bypassable;
a modulator bank comprising a plurality of modulators each having an input and an output;
a modulator switch for connecting any encoder/interleaver output to any one or more modulator inputs;
a plurality of summers each having a respective plurality of inputs and an output; and
an output switch for connecting any modulator outputs to any summer input.

5. An apparatus according to claim 4 wherein each block in each encoder/interleaver is individually configurable and bypassable so as to function as an encoder/interleaver for any IS-95 physical channel layer type and as an encoder/interleaver for any IS-95 3G physical channel layer type.

6. A CDMA receiver apparatus comprising:
a plurality of fingers each having an input and an output;
a switch for switching each of a plurality of receive inputs to any one or more finger inputs;
a plurality of summers each having a respective plurality of inputs and an output;
a weighting and thresholding circuitry connected to the outputs of the fingers and having thresholded outputs, the circuitry adapted to perform weighting and thresholding of outputs of the fingers; and
an output switch adapted to connect any thresholded output to any summer input.

7. An apparatus according to claim 6 further comprising:
a decoder/de-interleaver bank having a plurality of decoder/de-interleavers each having an input and an output;
a signal router for connecting any summer output to any decoder/de-interleaver input.

8. An apparatus according to claim 7 wherein each decoder/de-interleaver is dynamically configurable to function according to any one of a plurality of different standards.

9. An apparatus according to claim 6 wherein each finger is dynamically configurable to function according to any one of a plurality of different standards.

10. An apparatus according to claim 6 further comprising a control block which reconfigures the entire apparatus once per frame.

11. A CDMA receiver apparatus comprising:
a plurality of fingers each having an input and an output, wherein each finger comprises three demodulators connected together in a delay locked loop, each demodulator comprising:
a plurality of configurable functional blocks each configurable to function for at least two different standards;
for each said standard, a respective plurality of functional blocks permanently configured to function for the standard; and
switching means for switching the demodulator between different standards by configuring each configurable block to that standard, by switching in each permanently configured block for that standard, and by switching out each permanently configured block for any other standard;
a switch for switching each of a plurality of receive inputs to any one or more finger inputs;
a plurality of summers each having a respective plurality of inputs and an output;
a weighting and thresholding circuitry connected to the outputs of the fingers and having thresholded outputs, the circuitry adapted to perform weighting and thresholding of outputs of the fingers; and
an output switch adapted to connect any thresholded output to any summer input.

12. An apparatus according to claim 11 wherein:
said configurable functional blocks comprise a PN despreader block and a signal routing block;
said permanently configured blocks comprise:
a) a first channel connectable to receive an output of the PN despreader block and comprising demodulation functions for a first standard;
b) a second channel also connectable to receive said output of the PN despreader block and comprising demodulation functions for a second type;
the first and second channels each having outputs connected to the signal routing block.

13. An apparatus according to claim 12 wherein the first channel comprises integrate, fast Hadamard transform and compute metrics blocks, and the second channel comprises carrier phase recovery and integrate blocks.

14. A CDMA receiver apparatus comprising:
a plurality of fingers each having an input and an output;
a switch for switching each of a plurality of receive inputs to any one or more finger inputs;
a plurality of summers each having a respective plurality of inputs and an output;
a weighting and thresholding circuitry connected to the outputs of the fingers and having thresholded outputs, the circuitry adapted to perform weighting and thresholding of outputs of the fingers;
an output switch adapted to connect any thresholded output to any summer input;
a decoder/de-interleaver bank having a plurality of decoder/de-interleavers each having an input and an output; and
a signal router for connecting any summer output to any decoder/de-interleaver input; wherein
each decoder/de-interleaver comprises:
a long code demodulation block;
a block de-interleaver block;
a symbol integration block;
a convolutional decoder block;
a remove encoder tail block;
a remove and check CRC block; and
a remove reserved bits block,
wherein each block of the decoder/de-interleaver is individually configurable or bypassable.

15. An apparatus according to claim 11 wherein each block of each decoder/de-interleaver is individually configurable or bypassable so as to function as an decoder/de-interleaver for any IS-95 physical channel layer type and as an decoder/de-interleaver for any IS-95 3G physical channel layer type.

* * * * *

UNITED STATES PATENT AND TRADEMARK OFFICE
CERTIFICATE OF CORRECTION

PATENT NO. : 6,333,926 B1  
DATED : December 25, 2001  
INVENTOR(S) : Frank Martin Van Heeswyk et al.

It is certified that error appears in the above-identified patent and that said Letters Patent is hereby corrected as shown below:

Column 16,
Line 39, please insert the omitted line -- 4. The process repeats every frame. --

Column 20,
Line 56, claim 15 should read as follows: -- An apparatus according to claim 14 --

Signed and Sealed this

Seventeenth Day of September, 2002

Attest:

Attesting Officer

JAMES E. ROGAN
*Director of the United States Patent and Trademark Office*